United States Patent
Osborn et al.

(10) Patent No.: US 12,215,225 B2
(45) Date of Patent: *Feb. 4, 2025

(54) ANTIMICROBIAL POLYMER RESINS, FIBERS, AND YARNS WITH PHOSPHORUS CONTENT

(71) Applicant: Ascend Performance Materials Operations LLC, Houston, TX (US)

(72) Inventors: Scott E. Osborn, Houston, TX (US); Wai-shing Yung, Houston, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,161

(22) Filed: Nov. 2, 2022

(65) Prior Publication Data

US 2023/0065257 A1 Mar. 2, 2023

Related U.S. Application Data

(63) Continuation of application No. 16/509,896, filed on Jul. 12, 2019, now Pat. No. 11,505,701.

(60) Provisional application No. 62/697,786, filed on Jul. 13, 2018.

(51) Int. Cl.
| | |
|---|---|
| *C08L 77/02* | (2006.01) |
| *C08K 3/02* | (2006.01) |
| *C08K 3/08* | (2006.01) |
| *D01D 5/00* | (2006.01) |
| *D01F 1/10* | (2006.01) |
| *D01F 6/90* | (2006.01) |
| *D01F 9/08* | (2006.01) |
| *D06M 101/34* | (2006.01) |

(52) U.S. Cl.
CPC .............. *C08L 77/02* (2013.01); *C08K 3/08* (2013.01); *D01D 5/0023* (2013.01); *D01F 1/103* (2013.01); *D01F 6/90* (2013.01); *D01F 9/08* (2013.01); *C08K 2003/026* (2013.01); *C08K 2003/0893* (2013.01); *C08L 2203/12* (2013.01); *D06M 2101/34* (2013.01)

(58) Field of Classification Search
None
See application file for complete search history.

(56) References Cited

U.S. PATENT DOCUMENTS

| | | | | |
|---|---|---|---|---|
| 4,237,034 | A * | 12/1980 | Tomka | C08K 3/22 524/400 |
| 4,701,518 | A | 10/1987 | Osborn et al. | |
| 5,064,599 | A | 11/1991 | Ando et al. | |
| 5,654,355 | A | 8/1997 | Kurian et al. | |
| 6,013,275 | A | 1/2000 | Konagaya et al. | |
| 2007/0173162 | A1 | 7/2007 | Ethiopia et al. | |
| 2015/0368380 | A1 * | 12/2015 | Kreyenschmidt | C08F 26/06 526/263 |
| 2017/0130055 | A1 | 5/2017 | Isobe et al. | |

FOREIGN PATENT DOCUMENTS

| | | |
|---|---|---|
| JP | H09-512839 A | 12/1997 |
| JP | H11-222723 A | 8/1999 |

OTHER PUBLICATIONS

International Application No. PCT/US2019/041561, "International Search Report and Written Opinion", dated Sep. 23, 2019, 10 pages.

* cited by examiner

*Primary Examiner* — Robert T Butcher
(74) *Attorney, Agent, or Firm* — COZEN O'CONNOR

(57) ABSTRACT

The present disclosure relates to polymer resins, fibers, and yarns with permanent antimicrobial activity, and a method of producing the same. In one embodiment, the antimicrobial polymer resin comprises a polymer having less than 2500 ppm of zinc dispersed within the polymer, less than 1000 ppm of phosphorus, wherein the weight ratio of zinc to phosphorus is at least 1.3:1 or less than 0.64:1.

18 Claims, No Drawings

ANTIMICROBIAL POLYMER RESINS, FIBERS, AND YARNS WITH PHOSPHORUS CONTENT

CROSS-REFERENCE TO RELATED APPLICATION

This application is a continuation of U.S. application Ser. No. 16/509,896, filed on Jul. 12, 2019, which claims priority to U.S. Provisional Patent Application No. 62/697,786, filed Jul. 13, 2018, both of which are incorporated herein by reference.

FIELD

The present disclosure relates to polymer resins, fibers, and yarns having permanent antimicrobial properties. In particular, the present disclosure relates to antimicrobial fibers and yarns formed from a polymer resin composition comprising unique antimicrobial component(s).

BACKGROUND

There is a growing interest in fabrics having antimicrobial properties. In some instances, a number of treatments or coatings are applied to fibers to impart antimicrobial properties to fabrics. Compounds containing copper, silver, gold, or zinc, either individually or in combination, have been used in these applications to effectively combat pathogens such as bacteria, mold, mildew, viruses, spores, and fungi.

These types of antimicrobial fibers and fabrics may be used in many industries including healthcare, hospitality, military, and athletics, among others. However, conventional antimicrobial fibers and fabrics have difficulties in meeting many of the other (non-antimicrobial) requirements of these applications. For example, in the healthcare and hospitality industries, certain fabrics are required to be sanitary at all times. To comply with these sanitation standards, the fabrics are subject to daily washing and, often times, bleaching. As another example, athletic wear is susceptible to bacterial growth due to both internal and external factors, and sweat and bacteria transmitted through the skin can lead to the growth of bacteria in clothing fibers. In some cases, these bacteria lead to unpleasant odors, staining, fabric deterioration. In many applications repeated cycles of use and washing are quite common. Unfortunately, conventional fabrics have been found to deteriorate and lose antimicrobial properties during repeated uses and/or wash cycles.

Additionally, many purported antimicrobial fabrics do not demonstrate sufficient antimicrobial properties, nor do they retain these properties for the lifetime of the product in which they are utilized. In some instances, the antimicrobial additives may have adverse environmental consequences due to leaching from the fabric.

As one example of conventional antimicrobial yarns and fabrics, U.S. Pat. No. 6,584,668 discloses durable non-electrically conductive metal treatments applied to yarns and textile fabrics. The durable non-electrically conductive metal treatments are coatings or finishes applied to yarns and textile fabrics. The metal treatments may include silver and/or silver ions, zinc, iron, copper, nickel, cobalt, aluminum, gold, manganese, magnesium, and the like. The metal treatments are applied to the exterior surface of the yarn or fabric as a coating or film.

In addition, U.S. Pat. No. 4,701,518 discloses an antimicrobial nylon prepared in water with a zinc compound (ZnO) and phosphorus compound to form carpet fibers. The process produces nylon fibers for carpets having 18 denier per filament (dpf), and are prepared by conventional melt polymerization. Such carpet fibers typically have average diameters that are well above 10 microns, which are generally unsuitable for next-to-skin applications.

Although some references may teach the use of antimicrobial fibers and fabrics, a need still exists for antimicrobial fibers and fabrics that retain their antimicrobial properties after multiple washes, while maintaining fiber strength.

SUMMARY

According to one embodiment, the present disclosure relates to a polymer resin composition having permanent antimicrobial properties comprising: a polymer; less than 2500 ppm of zinc dispersed within the polymer; and less than 1000 ppm of phosphorus; wherein the weight ratio of the zinc to the phosphorus is: at least 1.3:1; or less than 0.64:1. In some aspects, the weight ratio of the zinc to the phosphorus is at least 2:1. In some aspects, the relative viscosity of the polymer resin composition ranges from 20 to 100. In some aspects, the polymer resin composition comprises from 200 ppm to 600 ppm zinc, optionally less than 700 ppm of zinc, e.g., less than 500 ppm zinc. In some aspects, the polymer resin composition comprises a delusterant including at least a portion of the phosphorus. In some aspects, there is no phosphorus in the polymer resin composition. The zinc may be provided via a zinc compound comprising zinc oxide, zinc acetate, zinc ammonium carbonate, zinc ammonium adipate, zinc stearate, zinc phenyl phosphinic acid, zinc pyrithione and/or combinations thereof. In some aspects, the zinc compound is not zinc phenyl phosphinate and/or zinc phenyl phosphonate and/or zinc ammonium adipate. In some aspects, the phosphorus may be provided via a phosphorus compound comprising phosphoric acid, benzene phosphinic acid, benzene phosphonic acid, manganese hypophosphite, sodium hypophosphite, monosodium phosphate, hypophosphorous acid, phosphorous acid, and/or combinations thereof. In one aspect, the polymer resin composition comprises less than 700 ppm zinc, e.g., less than 500 ppm of zinc, the polymer resin composition comprises a delusterant including at least a portion of the phosphorus, and fibers formed from the polymer resin composition inhibit greater than 89% of *S. aureus* as measured by ISO 20743:2013 and optionally have a zinc retention greater than 20%, e.g., greater than 45%. In one aspect, the polymer comprises a nylon, the zinc is provided in the form of zinc oxide and/or zinc pyrithione, and the relative viscosity of the polymer resin composition ranges from 20 to 100. In one aspect, the polymer comprises nylon-6,6, the zinc is provided in the form of zinc oxide, the weight ratio of zinc to phosphorus is at least 2:1, and fibers formed from the polymer resin composition inhibits greater than 95% of *S. aureus* as measured by ISO 20743:2013 and optionally have a zinc retention greater than 60%. The polymer resin composition may further comprise one or more additional antimicrobial agents comprising silver, tin, copper, and gold, and alloys, oxides, and/or combinations thereof.

In some embodiments, the present disclosure relates to an antimicrobial fiber having permanent antimicrobial properties comprising: a polymer; less than 2500 ppm of zinc dispersed within the polymer; and less than 1000 ppm of phosphorus; and wherein the denier of the antimicrobial fiber is less than 12 dpf. In some aspects, the weight ratio of the zinc to the phosphorus is: at least 1.3:1; or less than 0.64:1. In some aspects, the weight ratio of the zinc to the phosphorus is at least 2:1. In some aspects, the fibers have an average diameter less than 20 microns. In some aspects, the polymer comprises from 200 ppm to 600 ppm zinc, optionally less than 700 ppm of zinc, e.g., less than 500 ppm zinc. In some aspects, the polymer resin composition comprises a delusterant including at least a portion of the phosphorus. The antimicrobial fiber may have a zinc retention greater than 45%, e.g., greater than 70%. In some aspects, the zinc is a zinc compound comprising zinc oxide, zinc acetate, zinc ammonium carbonate, zinc ammonium adipate, zinc stearate, zinc phenyl phosphinic acid, zinc pyrithione and/or combinations thereof. In some aspects, the phosphorus is a phosphorus compound comprising phosphoric acid, benzene phosphinic acid, benzene phosphonic acid, manganese hypophosphite, sodium hypophosphite, monosodium phosphate, hypophosphorous acid, phosphorous acid, and/or combinations thereof. In one aspect, the polymer comprises less than 700 ppm zinc, e.g., less than 500 ppm of zinc, the polymer comprises a delusterant including at least a portion of the phosphorus, and the antimicrobial fibers inhibit greater than 89% of S. aureus as measured by ISO 20743:2013 and optionally have a zinc retention greater than 45%. In one aspect, the polymer comprises nylon, the zinc is provided in the form of zinc oxide and/or zinc pyrithione and/or optionally zinc ammonium adipate, wherein the relative viscosity of the polymer resin composition ranges from 20 to 100, and the antimicrobial fiber has a zinc retention greater than 60%, e.g., greater than 80%, wherein the fibers have an average diameter less than 18 microns. In one aspect, the polymer comprises nylon-6,6, the zinc is provided in the form of zinc oxide and/or zinc pyrithione and/or optionally zinc ammonium adipate, the weight ratio of zinc to phosphorus is at least 2:1, the antimicrobial fiber inhibits greater than 95% of S. aureus as measured by ISO 20743:2013, the antimicrobial fiber has a zinc retention greater than 60%, e.g., greater than 90%, the fibers have an average diameter less than 10 microns, and the fibers have a denier less than 5 dpf. The polymer may further comprise one or more additional antimicrobial agents comprising silver, tin, copper, and gold, and alloys, oxides, and/or combinations thereof.

In some embodiments, the present disclosure relates to a process for preparing an antimicrobial fiber having permanent antimicrobial properties, the process comprising: preparing an aqueous monomer solution; adding less than 2500 ppm of zinc dispersed within the aqueous monomer solution; adding less than 1000 ppm of phosphorus; polymerizing the aqueous monomer solution to form a polymer melt; and extruding the polymer melt to form an antimicrobial fiber, wherein the weight ratio of zinc to phosphorus is: at least 1.3:1; or less than 0.64:1, wherein the denier of the antimicrobial fiber is less than 12 dpf. The process may further comprise spinning the antimicrobial fiber to form a yarn; and dyeing the yarn. In some aspects, the polymer comprises from 200 ppm to 600 ppm zinc, optionally less than 700 ppm of zinc, e.g., less than 500 ppm zinc. In some aspects, the antimicrobial fiber has a zinc retention greater than 45%, e.g., greater than 70%. In some aspects, the step of adding phosphorus comprises adding a delusterant including at least a portion of the phosphorus. In some cases the process further comprises the step dyeing the antimicrobial fibers using a dye recipe to form dyed antimicrobial fibers; wherein the dye recipe has a pH ranging from 3.0 to 7.0; and wherein the dyed antimicrobial fibers have a zinc retention greater than 20%, and/or the steps of forming a yarn or fabric from the antimicrobial fibers; and dyeing the yarn or fabric.

In some embodiments, the present disclosure relates to Antimicrobial fibers having permanent antimicrobial properties comprising: a polymer; zinc dispersed within the polymer; and less than 1000 ppm of phosphorus; wherein the antimicrobial fibers demonstrate a zinc retention greater than 20%, after a dye bath using a dye recipe having a pH values, e.g., less than 5.0.

DETAILED DESCRIPTION

Introduction

As discussed above, some conventional antimicrobial fibers and fabrics utilize antimicrobial compounds to inhibit bacterial growth and/or protect the fibers and fabrics. For example, some fabrics may include antimicrobial additives, e.g., silver, coated or applied as a film on an exterior layer. However, it has been found that these treatments or coatings often leach from the fabric. Likewise, in non-coating applications where the antimicrobial additives are a component of the fiber, the antimicrobial additives have also been known to wash out, usually within about 10 wash-cycles, leaching the additives into the environment.

Also, the references that relate to higher denier (for example, greater than 12 dpf) and/or higher fiber diameter (for example, greater than 20 microns) fibers/filaments, e.g., carpet fibers, are typically not relevant to next-to-skin textiles due to the significant differences in the end application, the respective production process, and the resultant product.

It has now been discovered that presence of zinc and optionally phosphorus, each preferably in specific amounts (dispersed) in a polymer resin composition, provides for antimicrobial fibers and yarns that are able to retain permanent antimicrobial properties. Without being bound by theory, the use of the phosphorus compound in the specific amounts may allow the zinc to be more stably disposed in the polymer matrix and, as such, may retard leaching of the zinc from the fibers/yarns/fabrics, e.g., during washing. Stated another way, the polymer resin composition may have certain amounts of zinc and phosphorus embedded in the polymer matrix such that they retain near-permanent antimicrobial properties. In addition, the use of the specific amounts unexpectedly reduces or eliminates negative effects of phosphorus on the polymer resin composition, e.g., polymer drip (during spinning), increased polymer viscosity, and inefficiencies in production processes.

As a result, the disclosed fibers, yarns, and fabrics advantageously eliminate the need for a topical treatment to make apparel antimicrobial. The present antimicrobial fibers and fabrics have "built-in" antimicrobial properties. And these properties beneficially will not wash away after significant washing or wash cycles. Further, the antimicrobial fibers can maintain colorfastness (a characteristic that relates to a material's resistance to color fading or running) and durability. Unlike conventional antimicrobial fabrics, the present fibers and fabrics do not lose their antimicrobial activity from leaching and extraction after repeated use and wash cycles. Further, the present fibers have significantly lower denier and lower average diameter, which beneficially makes them useful in many end applications, e.g., apparel and filtration, where the thicker, higher denier fibers are unsuitable.

As an additional benefit, the fibers formed using the polymer resin composition, have advantageous physical features, e.g., lower denier and/or lower average fiber diameter, which allows them to be used in various applications, e.g., apparel or other next-to-skin applications where higher denier and/or higher fiber diameter are unsuitable.

In one aspect, the present disclosure provides a polymer resin composition, which may in some cases be used to form antimicrobial fibers. The polymer resin composition comprises antimicrobial agents, which are efficacious and are significantly resistant to washing or wearing from the fiber. In one aspect, the antimicrobial fibers form fabrics or certain portions of fabrics.

It was also beneficially found that providing zinc and phosphorus to the polymer resin composition during the production process of the fibers, e.g., to the aqueous monomer solution, produces fibers with antimicrobial agents evenly dispersed throughout the entire fiber, as opposed to only on the surface. In some existing processes, a topical treatment containing a (metal) anti-microbial agent, e.g., silver, is applied to the outer surface of the fabric to impart antimicrobial properties to the fabric. However, the coating is not dispersed throughout the fabric and may be more susceptible to leaching toxic components, e.g., silver, into the environment. Advantageously, it is believed that the present polymer resin composition may provide for reductions in such leaching. Additionally, antimicrobial fibers formed the present polymer resin composition do not require a separate application step, e.g., a topical treatment, since the antimicrobial agents are incorporated into the polymer matrix.

Polymer

In some embodiments, the polymer resin composition may comprise a polymer suitable for producing fibers and fabrics. The polymer may vary widely. The polymer may include but is not limited to, a thermoplastic polymer, polyester, rayon, nylon, e.g., PA-6 and/or PA-6,6, polyethylene (PE), polypropylene (PP), polyethylene terephthalate (PET), polyethylene terephthalate glycol (PETG), co-PET, polylactic acid (PLA), and polytrimethylene terephthalate (PTT). In some embodiments, the polymer resin composition may comprise PET, for its strength, longevity during washing, ability to be made permanent press, and ability to be blended with other fibers. In some embodiments, the polymer may be Nylon 6,6. In some cases, nylon is considered a stronger fiber than PET and exhibits a non-drip burning characteristic that is beneficial e.g., in military applications, and is more hydrophilic than PET. The polymer used in the present disclosure can be a polyamide, polyether amide, polyether ester or polyether urethane or a mixture thereof.

In some cases, the polymer resin composition may comprise polyamides. Common polyamides include nylons and aramids. For example, the polyamide may comprise PA-4T/4I; PA-4T/6I; PA-5T/5I; PA-6; PA-6,6; PA-6,6/6; PA-6,6/6T; PA-6T/6I; PA-6T/6I/6; PA-6T/6; PA-6T/6I/66; PA-6T/MPMDT (where MPMDT is polyamide based on a mixture of hexamethylene diamine and 2-methylpentamethylene diamine as the diamine component and terephthalic acid as the diacid component); PA-6T/66; PA-6T/610; PA-10T/612; PA-10T/106; PA-6T/612; PA-6T/10T; PA-6T/10I; PA-9T; PA-10T; PA-12T; PA-10T/10I; PA-10T/12; PA-10T/11; PA-6T/9T; PA-6T/12T; PA-6T/10T/6I; PA-6T/6I/6; PA-6T/6I/12; and combinations thereof. Additional suitable polyamides, additives, and other components are disclosed in U.S. patent application Ser. No. 16/003,528 (US Publication No. 2018/0371656A1).

In some preferred cases, the polyamide-based, e.g., nylon-based, compounds are utilized as the polymer resin. It has surprisingly been found that these nylon-based polymers, when utilized with the aforementioned zinc and/or phosphorus additives and formed into fabrics, may provide odor control features. In some cases, it has been found that conventional polymer resins that utilize polyester polymer resins harbor and allow to flourish different types of bacteria, as compared to those of nylon. For example, micrococcus bacteria have been found to flourish in polyester-based fabrics. Thus the use of nylon-based polymers, along with the aforementioned additives, would be believed to yield fabrics that demonstrate significantly lower levels of micrococcus bacteria.

The polymer resin composition may, in some embodiments, comprise a combination of polyamides. By combining various polyamides, the final composition may be able to incorporate the desirable properties, e.g., mechanical properties, of each constituent polyamides. For example, in some embodiments, the polyamide comprises a combination of PA-6, PA-6,6, and PA-6,6/6T. In these embodiments, the polyamide may comprise from 1 wt % to 99 wt % PA-6, from 30 wt % to 99 wt % PA-6,6, and from 1 wt % to 99 wt % PA-6,6/6T. In some embodiments, the polyamide comprises one or more of PA-6, PA-6,6, and PA-6,6/6T. In some aspects, the polymer resin composition comprises about 6 wt % of PA-6 and about 94 wt % of PA-6,6. In some aspects, the polymer resin composition comprises blends of any of the polyamides mentioned herein.

The polymer resin composition may also comprise polyamides produced through the ring-opening polymerization or polycondensation, including the copolymerization of lactams. Without being bound by theory, these polyamides may include, for example, those produced from propriolactam, butyrolactam, valerolactam, and caprolactam. For example, in some embodiments, the polyamide is a polymer derived from the polymerization of caprolactam. In those embodiments, the polymer comprises at least 10 wt % caprolactam, e.g., at least 15 wt %, at least 20 wt %, at least 25 wt %, at least 30 wt %, at least 35 wt %, at least 40 wt %, at least 45 wt %, at least 50 wt %, at least 55 wt %, or at least 60 wt %. In some embodiments, the polymer includes from 10 wt % to 60 wt % of caprolactam, e.g., from 15 wt % to 55 wt %, from 20 wt % to 50 wt %, from 25 wt % to 45 wt %, or from 30 wt % to 40 wt %. In some embodiments, the polymer comprises less than 60 wt % caprolactam, e.g., less than 55 wt %, less than 50 wt %, less than 45 wt %, less than 40 wt %, less than 35 wt %, less than 30 wt %, less than 25 wt %, less than 20 wt %, or less than 15 wt %. Furthermore, the polymer resin composition may comprise the polyamides produced through the copolymerization of a lactam with a nylon, for example, the product of the copolymerization of a caprolactam with PA-6,6.

The polymer resin composition, in some embodiments, comprises from 1 wt % to 99.9 wt % polymer, e.g., from 50 wt % to 99.9 wt %, from 75 wt % to 99.9 wt %, from 90 wt % to 99.9 wt %, from 95 wt % to 99.9 wt %, from 95 wt % to 99 wt %, or from 96 wt % to 99 wt %. In terms of lower limits, the polymer resin composition may comprise at least 50 wt % polymer, e.g., at least 75 wt %, at least 90 wt %, at least 95 wt %, or at least 96 wt %. In terms of upper limits, the polymer resin composition may comprise less than 99.9 wt %, e.g., less than 99.8 wt %, less than 99.5 wt %, less than 99.2 wt %, less than 99.0 wt %, less than 98.7 wt %, less than 98.5 wt %, or less than 98.3 wt %.

In some embodiments, the polymer resin composition may comprise additional additives. The additives include pigments, hydrophilic or hydrophobic additives, anti-odor additives and antimicrobial/anti-fungal inorganic compounds, such as copper, zinc, tin and silver.

In some aspects, the polymer resin composition can be combined with color pigments for coloration for the use in antimicrobial finished fabrics to withstand fading. In some aspects, the polymer resin composition can be combined with UV additives to withstand fading and degradation in fabrics exposed to significant UV light. In some aspects, the polymer resin composition can be combined with additives to make the surface of the fiber hydrophilic or hydrophobic. In some aspects, the polymer resin composition can be combined with additives to make the fabric stain resistant. In some aspects, the polymer resin composition can be combined with pigments with the antimicrobial compounds so that the need for conventional dyeing and disposal of dye materials is avoided.

In some aspects, the polymer resin can be formed by conventional polymerization of the polymer resin composition in which an aqueous solution of at least one diamine-dicarboxylic acid salt is heated to remove water and effect polymerization to form an antimicrobial nylon. This aqueous solution is preferably a mixture which includes at least one polyamide-forming salt in combination with the specific amounts of zinc and phosphorus described herein to produce a polymer resin composition. Conventional polyamide salts are formed by reaction of diamines with dicarboxylic acids with the resulting salt providing the monomer. In some embodiments, a preferred polyamide-forming salt is hexamethylene diammonium adipate (nylon 6,6 salt) formed by the reaction of equimolar amounts of hexamethylenediamine and adipic acid.

Antimicrobial Components

As noted above, the polymer resin composition includes zinc and optionally phosphorus, preferably in specific amounts in the polymer resin composition, to provide the aforementioned antimicrobial benefits. As used herein, "zinc" refers to at least one zinc molecule or ion. As used herein, "phosphorus" refers to at least one phosphorus molecule or ion.

The polymer resin composition comprises zinc, e.g., elemental zinc is dispersed within the polymer resin composition. In some embodiments, the concentration of zinc in the polymer resin composition is in a range from 1 ppm to 2500 ppm, e.g., from 1 ppm to 2000 ppm, from 1 ppm to 1500 ppm, from 1 ppm to 1000 ppm, from 25 ppm to 950 ppm, from 50 ppm to 900 ppm, from 100 ppm to 800 ppm, from 150 ppm to 700 ppm, from 175 ppm to 600 ppm, from 200 ppm to 600 ppm, from 250 ppm to 550 ppm, from 200 ppm to 500 ppm, from 350 ppm to 550 ppm, from 200 ppm to 500 ppm, from 215 ppm to 400 ppm, from 225 ppm to 350 ppm, or from 250 ppm to 300 ppm. In terms of lower limits, the polymer resin composition comprises greater than 1 ppm zinc, e.g., greater than 5 ppm, greater than 10 ppm, greater than 25 ppm, greater than 50 ppm, greater than 75 ppm, greater than 100 ppm, greater than 150 ppm, greater than 200 ppm, greater than 225 ppm, greater than 250 ppm, or greater than 300 ppm. In terms of upper limits, the polymer resin composition comprises less than 2500 ppm zinc, e.g., less than 2000 ppm, less than 1500 ppm, less than 1000 ppm, less than 900 ppm, less than 800 ppm, less than 700 ppm, less than 600 ppm, less than 550 ppm, less than 500 ppm, less than 400 ppm, less than 350 ppm, or less than 300 ppm. In some aspects, zinc is embedded in the polymer formed from the polymer resin composition.

The inventors have found that the use of specific weight ratios of zinc to phosphorus minimizes the negative effects of the phosphorus on the polymer resin composition. For example, too much phosphorus in the polymer resin composition can lead to polymer drip (during spinning), increased polymer viscosity, and inefficiencies in production processes. By employing phosphorus and/or zinc in the amounts disclosed herein, the resultant polymer resin compositions provide for improved antimicrobial properties as well as improved processability.

In one embodiment, the weight ratio of elemental zinc to elemental phosphorus in the polymer resin composition may be greater than 1.3:1, e.g., greater than 1.4:1, greater than 1.5:1, greater than 1.6:1, greater than 1.7:1, greater than 1.8:1, or greater than 2:1. In terms of ranges, the weight ratio of zinc to phosphorus in the polymer resin composition may range from 1.3:1 to 30:1, e.g., from 1.4:1 to 25:1, from 1.5:1 to 20:1, from 1.6:1 to 15:1, from 1.8:1 to 10:1, from 2:1 to 8:1, from 3:1 to 7:1, or from 4:1 to 6:1. In terms of upper limits, the weight ratio of zinc to phosphorus in the polymer resin composition may be less than 30:1, e.g., less than 28:1, less than 26:1, less than 24:1, less than 22:1, less than 20:1, or less than 15:1. In some aspects, there is no phosphorus in the polymer resin composition. In other aspects, a very low amount of phosphorus is present. In some cases, phosphorus is incorporated into the polymer matrix along with zinc.

In one embodiment, the weight ratio of elemental zinc to elemental phosphorus in the polymer resin composition may be less than 0.64:1, e.g., less than 0.62:1, less than 0.6:1, e.g., less than 0.5:1, less than 0.45:1, less than 0.4:1, less than 0.3:1, or less than 0.25:1. In terms of ranges, the weight ratio of zinc to phosphorus in the polymer resin composition may range from 0.001:1 to 0.64:1, e.g., from 0.01:1 to 0.6:1, from 0.05:1 to 0.5:1, from 0.1:1 to 0.45:1, from 0.2:1 to 0.4:1, from 0.25:1 to 0.35:1, or from 0.2:1 to 0.3:1. In terms of lower limits, the weight ratio of zinc to phosphorus in the polymer resin composition may be greater than 0.001:1, e.g., greater than 0.005:1, greater than 0.01:1, greater than 0.05:1, greater than 0.1:1, greater than 0.15:1, or greater than 0.2:1.

The manner in which the phosphorus is provided to the polymer resin composition may vary widely. Many techniques for providing phosphorus in the polymer resin composition are within the contemplation of this disclosure and will be suitable. As one example, phosphorus or a phosphorus compound may be added as a component of the resin, e.g., in a manner similar to that of the zinc.

In one embodiment, the phosphorus may be provided as a component of another additive. For example, the phosphorus may be a component of a delusterant that is added to the polymer composition. Specifically, the phosphorus may be a coating additive/component of the delusterant. In some aspects, the delusterant comprises titanium dioxide. The titanium dioxide may comprise a phosphorus-containing surface coating, e.g., manganese coated titanium dioxide. In some aspects, the phosphorus present in the polymer resin composition is entirely supplied by the additive, e.g., delusterant. In some aspects, the phosphorus present in the polymer resin composition is partly supplied by the additive and partly as a phosphorus additive.

In some aspects, the phosphorus present in the polymer resin composition is entirely supplied by the delusterant, e.g., titanium dioxide additive, and no phosphorus, e.g., phosphorus additive, is separately added to the polymer resin composition. For example, the titanium dioxide additive may be present in the polymer composition, wherein the titanium dioxide includes less than 1000 ppm phosphorus based on the total weight of the polymer resin composition. In some embodiments, the polymer resin composition may include a titanium dioxide additive and a phosphorus additive, which in conjunction, supply less than 1000 ppm of phosphorus based on the total weight of the polymer resin composition.

In some embodiments, inorganic pigment-like materials can be utilized as delusterants. The delusterants may comprise one or more of titanium dioxide, barium sulfate, barium titanate, zinc titanate, magnesium titanate, calcium titanate, zinc oxide, zinc sulfide, lithopone, zirconium dioxide, calcium sulfate, barium sulfate, aluminum oxide, thorium oxide, magnesium oxide, silicon dioxide, talc, mica, and the like. Colored materials such as carbon black, copper phthalocyanine pigment, lead chromate, iron oxide, chromium oxide, and ultramarine blue may also be used.

Regardless of how the phosphorus is provided, the phosphorus is present in the polymer resin composition. In some embodiments, the concentration of phosphorus in the polymer resin composition ranges from 10 ppm to 1000 ppm, e.g., from 20 ppm to 950 ppm, from 30 ppm to 900 ppm, from 20 ppm to 200 ppm, from 10 ppm to 300 ppm, from 20 ppm to 150 ppm, from 50 ppm to 150 ppm, from 50 ppm to 850 ppm, from 100 ppm 800 ppm, from 150 ppm to 750 ppm, from 200 ppm to 600 ppm, from 250 ppm to 550 ppm, from 300 ppm to 500 ppm, or from 350 ppm to 450 ppm. In terms of upper limits, the concentration of phosphorus in the polymer resin composition may be less than 1000 ppm, e.g., less than 950 ppm, less than 900 ppm, less than 800 ppm, less than 700 ppm, less than 600 ppm, less than 500 ppm, less than 400 ppm, less than 300 ppm, or less than 200 ppm. In terms of lower limits, the concentration of phosphorus in the polymer resin composition may be greater than 10 ppm, e.g., greater than 20 ppm, greater than 40 ppm, greater than 60 ppm, greater than 80 ppm, greater than 100 ppm, greater than 150 ppm, or greater than 180 ppm. In some aspects, phosphorus is embedded in the polymer of the polymer resin composition.

Advantageously, it has been discovered that adding the above identified proportions of zinc and phosphorus may result in a beneficial relative viscosity of the polymer resin composition. In some embodiments, the relative viscosity of the polymer resin composition ranges from 5 to 100, e.g., from 20 to 100, from 25 to 80, from 30 to 60, from 40 to 50, from 20 to 35, or from 25 to 32. In terms of lower limits, the relative viscosity of the polymer resin composition may be greater than 5, e.g., greater than 10, greater than 20, greater than 25, greater than 30, greater than 35, or greater than 40. In terms of upper limits, the relative viscosity of the polymer resin composition may be less than 100, e.g., less than 80, less than 60, less than 40, less than 35 or less than 30.

It has been determined that a specific amount of zinc and phosphorus can be mixed in a polymer resin composition, e.g., polyamide resin composition, in finely divided form, such as in the form of granules, flakes and the like, to provide a polymer resin composition that can be subsequently formed, e.g., extruded or otherwise drawn, into fibers by conventional methods to produce fibers having substantially improved antimicrobial activity. The zinc and phosphorus are employed in the polymer resin composition in the aforementioned amounts to provide a fiber with permanent antimicrobial activity.

As noted herein, by utilizing a polymer resin composition having the aforementioned zinc concentration, phosphorus concentration, and optionally the range of relative viscosity and or other characteristics, the resultant antimicrobial fiber is capable of retaining a higher percentage of zinc. The resulting yarns formed from the fibers have near-permanent antimicrobial properties.

In some embodiments, the antimicrobial fibers formed from the polymer resin composition have a zinc retention greater than 40% after a dye bath, e.g., greater than 44%, greater than 45%, greater than 50%, greater than 55%, greater than 60%, greater than 65%, greater than 70%, greater than 75%, greater than 80%, greater than 90%, greater than 95%, or greater than 99%. In terms of upper limits, the antimicrobial fibers may have a zinc retention of less than 100%, e.g., less than 99.9%, less than 98%, less than 95% or less than 90%. In terms of ranges, the antimicrobial fiber has a zinc retention in a range from 40% to 100%, e.g., from 45% to 99.9%, from 50% to 99.9%, from 75% to 99.9%, from 80% to 99%, or from 90% to 98%. In some cases, the ranges and limits related to dye recipes having higher pH values, e.g., greater than (and/or including) 4.0, greater than 4.2, greater than 4.5, greater than 4.7, greater than 5.0, or greater than 5.0.

In some embodiments, the antimicrobial fibers formed from the polymer resin composition have a zinc retention greater than 20%, e.g., greater than 25%, greater than 30%, greater than 35%, greater than 40%, greater than 45%, greater than 50%, greater than 55%, or greater than 60%. In terms of upper limits, the antimicrobial fibers may have a zinc retention of less than 80%, e.g., less than 77%, less than 75%, less than 70%, less than 68%, or less than 65%. In terms of ranges, the antimicrobial fibers may have a zinc retention ranging from 20% to 80%, e.g., from 25% to 77%, from 30% to 75%, or from 35% to 70%. In some cases, the ranges and limits related to dye recipes having lower pH values, e.g., less than (and/or including) 5.0, less than 4.7, less than 4.6, or less than 4.5.

The zinc retention of a fiber formed from the polymer resin composition may be calculated by measuring zinc content before and after a dye bath operation. The amount of zinc retained after the dye bath may be measured by known methods. For the dye bath, an Ahiba dyer (from Datacolor) may be employed. In a particular instance, twenty grams of un-dyed fabric and 200 ml of dye liquor may be placed in a stainless steel can, the pH may be adjusted to the desired level, the stainless steel can may be loaded into the dyer; the sample may be heated to 40° C. then heated to 100° C. (optionally at 1.5° C./minute). In some cases a temperature profile may be employed, for example, 1.5° C./minute to 60° C., 1° C./minute to 80° C., and 1.5° C./minute to 100° C. The sample may be held at 100° C. for 45 minutes, followed by cooling to 40° C. at 2° C./minute, then rinsed and dried to yield the dyed product.

In some embodiments, antimicrobial fibers formed from the polymer resin composition inhibit or reduce *Staph aureus* activity. The antimicrobial fibers (or the yarns or fabrics made therefrom) inhibit/reduce *Staph aureus* activity, as measured by ISO 20743:2013, by greater than 85%, e.g., greater than 86%, greater than 89%, greater than 90%, greater than 92%, greater than 95%, greater than 97%, greater than 98%, greater than 99%, greater than 99.5%, or greater than 99.9%.

In some embodiments, antimicrobial fibers formed from the polymer resin composition inhibit or reduce *Klebsiella* activity. The antimicrobial fibers (or the yarns or fabrics made therefrom) inhibit/reduce *Klebsiella* activity, as measured by ISO 20743:2013, by greater than 76.1%, e.g., greater than 77%, greater than 80%, greater than 85%, greater than 90%, greater than 92%, greater than 95%, greater than 97%, greater than 98%, greater than 99%, greater than 99.5%, or greater than 99.9%.

In some embodiments, antimicrobial fibers formed from the polymer resin composition inhibit or reduce *Staph aureus* activity. The antimicrobial fibers (or the yarns or fabrics made therefrom) inhibit/reduce *Staph aureus* activity (colony forming units per milliliter), as measured by ASTM E35.15 WK45351, where the yarn may be "as spun." The test may be modified to employ a single specimen (1.5 grams), 15 ml neutralizer. In such cases, the antimicrobial fibers (or the yarns or fabrics made therefrom) inhibit/reduce Staph aureus activity by greater than 13%, e.g., greater than 25%, greater than 50%, greater than 75%, greater than 80%, greater than 85%, greater than 90%, or greater than 92%.

In some embodiments, the antimicrobial fibers (or the yarns or fabrics made therefrom) inhibit/reduce *Staph aureus* activity (colony forming units per milliliter), as measured by ASTM E35.15 WK45351, where the yarn may be spun into yarn, extracted with acetone, and then extracted using boiling water for one hour. In such cases, the antimicrobial fibers (or the yarns or fabrics made therefrom) inhibit/reduce *Staph aureus* activity by greater than 75%, e.g., greater than 80%, greater than 85%, greater than 90%, greater than 95%, greater than 97%, or greater than 98%.

In some embodiments, the antimicrobial fibers (or the yarns or fabrics made therefrom) inhibit/reduce *Staph aureus* activity (colony forming units per milliliter), as measured by ASTM E2149, where the yarn may be "as spun." The test may be modified to employ a single specimen (1.5 grams), 20 ml inoculum, an 8 hour incubation time. In such cases, the antimicrobial fibers (or the yarns or fabrics made therefrom) inhibit/reduce *Staph aureus* activity by greater than 50%, e.g., greater than 75%, greater than 85%, greater than 90%, greater than 95%, greater than 97%, greater than 97.5%, greater than 97.8%, or greater than 99%

In some embodiments, the antimicrobial fibers (or the yarns or fabrics made therefrom) inhibit/reduce *Staph aureus* activity (colony forming units per milliliter), as measured by ASTM E2149, where the fibers may be spun into yarn, extracted with acetone, and then extracted using boiling water for one hour. The test may be modified to employ a single specimen (1.5 grams), 20 ml inoculum, an 8 hour incubation time. In such cases, the antimicrobial fibers (or the yarns or fabrics made therefrom) inhibit/reduce *Staph aureus* activity by greater than 50%, e.g., greater than 55%, greater than 60%, greater than 63%, greater than 75%, greater than 80%, greater than 85%, greater than 90%, greater than 92%, greater than 95%, greater than 97%, or greater than 98%.

In some embodiments, the zinc may be provided as a zinc compound. The zinc compound may comprise zinc oxide, zinc acetate, zinc ammonium carbonate, zinc ammonium adipate, zinc stearate, zinc phenyl phosphinic acid, zinc pyrithione and combinations thereof. In some aspects, the zinc is provided in the form of zinc oxide. In some aspects, the zinc is not provided via zinc phenyl phosphinate and/or zinc phenyl phosphonate. Beneficially, the inventors believe that these particular zinc compounds work particularly well because they readily disassociate to form more zinc ions.

In some embodiments, the phosphorus may be provided as a phosphorus compound. In some aspects, the phosphorus compound may comprise phenylphosphinic acid, diphenylphosphinic acid, sodium phenylphosphinate, phosphorous acid, benzene phosphonic acid, calcium phenylphosphinate, potassium B-pentylphosphinate, methylphosphinic acid, manganese hypophosphite, sodium hypophosphite, monosodium phosphate, hypophosphorous acid, dimethylphosphinic acid, ethylphosphinic acid, diethylphosphinic acid, magnesium ethylphosphinate, triphenyl phosphite, diphenylrnethyl phosphite, dimethylphenyl phosphite, ethyldiphenyl phosphite, phenylphosphonic acid, methylphosphonic acid, ethylphosphonic acid, potassium phenylphosphonate, sodium methylphosphonate, calcium ethylphosphonate, and combinations thereof. In some embodiments, the phosphorus compound may comprise phosphoric acid, benzene phosphinic acid, benzene phosphonic acid, and combinations thereof. The phosphorus or phosphorus compound may also be dispersed in the polymer along with zinc.

In some embodiments, the antimicrobial agent, e.g., zinc, is added with phosphorus to promote the incorporation of the antimicrobial agent into the polymer matrix of the polymer resin composition. This procedure advantageously allows for more uniform dispersion of the antimicrobial agent throughout the eventual fiber. Further, this combination "builds-in" the antimicrobial within the polymer resin composition to help prevent or limit the active antimicrobial ingredients from being washed from the fiber.

In some embodiments, the polymer resin composition may include additional antimicrobial agents other than zinc. The additional antimicrobial agents may be any suitable antimicrobial, such as silver, copper, and/or gold in metallic forms (e.g., particulates, alloys and oxides), salts (e.g., sulfates, nitrates, acetates, citrates, and chlorides) and/or in ionic forms. In some aspects, further additives, e.g., additional antimicrobial agents, are added to the polymer resin composition.

Fibers, Yarns, and Molded Products

In some embodiments, the present disclosure relates to antimicrobial fibers and yarns formed from the polymer resin compositions disclosed herein. The polymer resin compositions impart permanent antimicrobial properties to the resulting fibers. The antimicrobial fibers can be formed from a polymer resin composition having a specific amount of zinc, e.g., less than 2500 ppm or less than 1000 ppm (dispersed within the polymer resin composition) and a specific amount of phosphorus, e.g., less than less than 1000 ppm (dispersed within the polymer resin composition).

Fiber Dimensions and Distributions

In some embodiments, the fibers have an average fiber diameter less than the diameter of fibers formed for carpet-related applications, which are generally unsuitable for next-to-skin applications. For example the fibers may have an average fiber diameter less than 20 microns, e.g., less than 18 microns, less than 17 microns, less than 15 microns, less than 12 microns, less than 10 microns, less than 7 microns, less than 5 microns, less than 3 microns, or less than 2 microns.

In some embodiments, the fibers have an average fiber diameter of greater than 1 micron. For example, the average fiber diameter of the fibers may be greater than 1 micron, e.g., greater than 2 microns, greater than 5 microns, or greater than 10 microns. In terms of upper limits, the average fiber diameter of the fibers may have an average fiber diameter of less than 200 microns, e.g., less than 150 microns, less than 100 microns, less than 50 microns, or less than 10 microns. In terms of ranges, the average fiber diameter of the fibers may be from 1 to 200 microns, e.g., from 2 to 150 microns, from 5 to 100 microns, or from 5 to 50 microns.

Measurements for fiber diameter and denier of filaments are well known in the art.

In some aspects, the polymer resin composition can be processed to form antimicrobial fibers having a denier less than 12 denier per filament. As used herein, "denier per filament" or "dpf" refers to the fiber thickness for an individual filament. In some aspects, the antimicrobial fiber has a denier less than 12 dpf, e.g., less than 10 dpf, less than 8 dpf, less than 6 dpf, less than 5 dpf, less than 4 dpf, less than 3 dpf, less than 2.5 dpf, less than 2 dpf, or less than 1 dpf. In terms of ranges, the antimicrobial fiber has a denier in range from 0.1 dpf to 12 dpf, e.g., from 0.5 dpf to 10 dpf, from 0.1 dpf to 5 dpf, from 0.1 dpf to 3 dpf, from 0.3 dpf to 4 dpf, from 0.5 dpf to 4 dpf, from 0.5 dpf to 3 dpf, from 0.5 dpf to 2.5 dpf, from 0.1 dpf to 2 dpf, from 0.5 dpf to 3 dpf, from 1 dpf to 8 dpf, from 2 dpf to 6 dpf, from 3 dpf to 5 dpf. In terms of lower limits, the antimicrobial fiber has a denier greater than 0.1 dpf, e.g., greater than 0.3 dpf, greater than 0.5 dpf, greater than 0.8 dpf, greater than 1 dpf, greater than 2 dpf, greater than 4 dpf, or greater than 6 dpf.

Basis weight may be determined by ASTM D-3776 and reported in GSM (g/m²).

The processes described herein can form antimicrobial fibers having a relatively low oxidative degradation index ("ODI") value. A lower ODI indicates less severe oxidative degradation during manufacture. In some aspects, the ODI may range from 10 to 150 ppm. ODI may be measured using gel permeation chromatography (GPC) with a fluorescence detector. The instrument is calibrated with a quinine external standard. 0.1 grams of nylon is dissolved in 10 mL of 90% formic acid. The solution is then analyzed by GPC with the fluorescence detector. The detector wavelengths for ODI are 340 nm for excitation and 415 nm for emission. In terms of upper limits, the ODI of the antimicrobial fibers may be 200 ppm or less, e.g., 180 ppm or less, 150 ppm or less, 125 ppm or less, 100 ppm or less, 75 ppm or less, 60 ppm or less, or 50 ppm or less. In terms of the lower limits, the ODI may be 1 ppm or greater, 5 ppm or greater, 10 ppm or greater, 15 ppm or greater, 20 ppm or greater, or 25 ppm or greater. In terms of ranges, the ODI of the antimicrobial fibers may be from 1 to 200 ppm, from 1 to 180 ppm, from 1 to 150 ppm, from 5 to 125 ppm, from 10 to 100 ppm, from 1 to 75 ppm, from 5 to 60 ppm, or from 5 to 50 ppm.

Additionally, the processes as described herein can result in a relatively low thermal degradation index ("TDI"). A lower TDI indicates a less severe thermal history of the polyamide during manufacture. TDI is measured the same as ODI, except that the detector wavelengths for TDI are 300 nm for excitation and 338 nm for emission. In terms of upper limits, the TDI of the antimicrobial fibers may be 4000 ppm or less, e.g., 3500 ppm or less, 3100 ppm or less, 2500 ppm or less, 2000 ppm or less, 1000 ppm or less, 750 ppm or less, or 700 ppm or less. In terms of the lower limits, the TDI of the antimicrobial fibers may be 20 ppm or greater, 100 ppm or greater, 125 ppm or greater, 150 ppm or greater, 175 ppm or greater, 200 ppm or greater, or 210 ppm or greater. In terms of ranges, the TDI may be from 20 to 400 ppm, 100 to 4000 ppm, from 125 to 3500 ppm, from 150 to 3100 ppm, from 175 to 2500 ppm, from 200 to 2000 ppm, from 210 to 1000 ppm, from 200 to 750 ppm, or from 200 to 700 ppm.

TDI and ODI test methods are also disclosed in U.S. Pat. No. 5,411,710. Lower TDI and/or ODI values are beneficial because they indicate that the antimicrobial fibers or the products formed therefrom are more durable than products having greater TDI and/or ODI. As explained above, TDI and ODI are measures of degradation and a product with greater degradation would not perform as well. For example, such a product may have reduced dye uptake, lower heat stability, lower life in a filtration application where the fibers are exposed to heat, pressure, oxygen, or any combination of these, and lower tenacity in industrial fiber applications.

One possible method that may be used in forming antimicrobial fibers with a lower TDI and/or ODI would be to include additives as described herein, especially antioxidants. Such antioxidants, although not necessary in conventional processes, may be used to inhibit degradation. An example of useful antioxidants include copper halides and Nylostab® S-EED® available from Clariant.

The antimicrobial fibers and fabrics advantageously have durable antimicrobial properties. In some aspects, the antimicrobial fibers may be formed from polyamides, polyesters, and blends thereof. The antimicrobial fibers may be spun to form a yarn that imparts the advantageous antimicrobial properties to textiles, e.g., apparel such as athletic wear or other next-to-skin apparel.

In some embodiments, the polymer resin composition is used to produce antimicrobial molded and processed products having permanent antimicrobial properties. In some aspects, a molded and processed product comprising the antimicrobial polymer resin composition is produced. In some aspects, the polymer resin composition can further comprise additives such as, for example, EBS and polyethylene wax, which are two non-limiting examples of additives.

In some embodiments, the polymer resin composition can be utilized in injection molding, extrusion molding, blowing, or laminating treatment methods after their direct addition during the molding process of plastics. In other embodiments, the polymer resin composition can be added to form a master batch that is used to form a molded product.

Some embodiments relate to a molded and processed product comprising the polymer resin composition. In some aspects, the molded and processed products are industrial supplies, various wrappers, consumer supplies or medical supplies, and the molded and processed products can be applied to interior materials such as blinds, wall papers and floor coverings; food related products such as films for wrapping, storage containers, and cutting boards; appliances such as humidifiers, washers, and dish washers; engineering materials such as water supply and drain pipes, and concrete; core materials in medical fields; and products for industrial purposes such as coatings. The molded and processed products are particularly useful for medical supplies, that is, medical devices/products for insertion into the human body such as catheters for medical purposes, prostheses, and products for repairing bones, or blood transfusion bags for medical purposes.

Processes for Making Fibers and Yarns

In some embodiments, the present disclosure provides a process for imparting permanent antimicrobial properties to fibers, yarns, and fabrics made from the polymer resin composition described herein. In some aspects, the fibers, e.g., polyamide fibers, are made by extruding a polymer resin formed in a melt polymerization process. During the melt polymerization process of the polymer resin composition, an aqueous monomer solution, e.g., salt solution, is heated under controlled conditions of temperature, time and pressure to evaporate water and effect polymerization of the monomers, resulting in a polymer melt. During the melt polymerization process, sufficient amounts of zinc and, optionally, phosphorus, are employed in the aqueous monomer solution to form the polymer resin composition before polymerization. After zinc and phosphorus are present in the aqueous monomer solution, the polymer resin composition may be polymerized. The polymerized polymer resin can subsequently be extruded into fibers.

In some embodiments, the process for preparing an antimicrobial fiber having permanent antimicrobial properties from the polymer resin composition includes preparing an aqueous monomer solution, adding less than 2500 ppm of zinc dispersed within the aqueous monomer solution, and adding less than 1000 ppm of phosphorus, polymerizing the aqueous monomer solution to form a polymer melt, and extruding the polymer melt to form an antimicrobial fiber. In this embodiment, the polymer resin composition comprises the resultant aqueous monomer solution after zinc and phosphorus are added. In some aspects, the polymer melt can be extruded to form an antimicrobial fiber having a denier per filament in a range from 0.5 dpf to 5 dpf.

In some embodiments, the process includes preparing an aqueous monomer solution. In some embodiments, the concentration of monomers in the aqueous monomer solution is less than 60 wt %, e.g., less than 58 wt %, less than 56.5 wt %, less than 55 wt %, less than 50 wt %, less than 45 wt %, less than 40 wt %, less than 35 wt %, or less than 30 wt %. In some embodiments, the concentration of monomers in the aqueous monomer solution is greater than 20 wt %, e.g., greater than 25 wt %, greater than 30 wt %, greater than 35 wt %, greater than 40 wt %, greater than 45 wt %, greater than 50 wt %, greater than 55 wt %, or greater than 58 wt %. In some embodiments, the concentration of monomers in the aqueous monomer solution is in a range from 20 wt % to 60 wt %, e.g., from 25 wt % to 58 wt %, from 30 wt % to 56.5 wt %, from 35 wt % to 55 wt %, from 40 wt % to 50 wt %, or from 45 wt % to 55 wt %. The balance of the aqueous monomer solution may comprise water and/or additional additives. In some embodiments, the monomers include a diacid and a diamine, e.g., nylon salt.

In some embodiments, the aqueous monomer solution is a nylon salt solution. The nylon salt solution may be formed by mixing a diamine and a diacid with water. For example, water, diamine, and dicarboxylic acid monomer are mixed to form a salt solution, e.g., mixing adipic acid and hexamethylene diamine with water. In some embodiments, the diacid may be a dicarboxylic acid and may be selected from the group consisting of oxalic acid, malonic acid, succinic acid, glutaric acid, pimelic acid, adipic acid, suberic acid, azelaic acid, sebacic acid, undecanedioic acid, dodecandioic acid, maleic acid, glutaconic acid, traumatic acid, and muconic acid, 1,2- or 1,3-cyclohexane dicarboxylic acids, 1,2- or 1,3-phenyl enediacetic acids, 1,2- or 1,3-cyclohexane diacetic acids, isophthalic acid, terephthalic acid, 4,4'-oxybisbenzoic acid, 4,4-benzophenone dicarboxylic acid, 2,6-napthalene dicarboxylic acid, p-t-butyl isophthalic acid and 2,5-furandicarboxylic acid, and mixtures thereof. In some embodiments, the diamine may be selected from the group consisting of ethanol diamine, trimethylene diamine, putrescine, cadaverine, hexamethyelene diamine, 2-methyl pentamethylene diamine, heptamethylene diamine, 2-methyl hexamethylene diamine, 3-methyl hexamethylene diamine, 2,2-dimethyl pentamethylene diamine, octamethylene diamine, 2,5-dimethyl hexamethylene diamine, nonamethylene diamine, 2,2,4- and 2,4,4-trimethyl hexamethylene diamines, decamethylene diamine, 5-methylnonane diamine, isophorone diamine, undecamethylene diamine, dodecamethylene diamine, 2,2,7,7-tetramethyl octamethylene diamine, bis(p-aminocyclohexyl)methane, bis(aminomethyl)norbornane, $C_2$-$C_{16}$ aliphatic diamine optionally substituted with one or more $C_1$ to $C_4$ alkyl groups, aliphatic polyether diamines and furanic diamines, such as 2,5-bis(aminomethyl)furan, and mixtures thereof. In preferred embodiments, the diacid is adipic acid and the diamine is hexamethylene diamine which are polymerized to form nylon 6,6.

It should be understood that the concept of producing a polyamide from diamines and diacids also encompasses the concept of other suitable monomers, such as, aminoacids or lactams. Without limiting the scope, examples of aminoacids can include 6-aminohexanoic acid, 7-aminoheptanoic acid, 11-aminoundecanoic acid, 12-aminododecanoic acid, or combinations thereof. Without limiting the scope of the disclosure, examples of lactams can include caprolactam, enantholactam, lauryllactam, or combinations thereof. Suitable feeds for the disclosed process can include mixtures of diamines, diacids, aminoacids and lactams.

Of course, as noted above, polyamides are only one type of polymer that may be utilized in the disclosed process. In addition, other polymerization reactants/reactions are contemplated.

After the aqueous monomer solution is prepared, zinc is added to the aqueous monomer solution to form the polymer resin composition. In some embodiments, less than 2500 ppm of zinc is dispersed within the aqueous monomer solution. In some aspects, further additives, e.g., additional antimicrobial agents, are added to the aqueous monomer solution. Optionally, phosphorus is added to the aqueous monomer solution.

In some cases, the polymer resin composition is polymerized using a conventional melt polymerization process. In one aspect, the aqueous monomer solution is heated under controlled conditions of time, temperature, and pressure to evaporate water, effect polymerization of the monomers and provide a polymer melt. In some aspects, the particular weight ratio of zinc to phosphorus may advantageously promote incorporation of zinc to the polymer matrix, retard viscosity reduction, and enhance its dyeability.

In some aspects, an antimicrobial nylon is prepared by a conventional melt polymerization of a nylon salt. Typically, the nylon salt solution is heated under pressure (e.g. 250 psig/$1825 \times 10^3$ N/m$^2$) to a temperature of, for example, about 245° C. Then the water vapor is exhausted off by reducing the pressure to atmospheric pressure while increasing the temperature to, for example, about 270° C. Before polymerization, zinc and, optionally, phosphorus are added to the nylon salt solution. The resulting molten nylon is held at this temperature for a period of time to bring it to equilibrium prior to being extruded into a fiber. In some aspects, the process may be carried out in a batch or continuous process. In some embodiments, the formed nylon melt is extruded to form an antimicrobial nylon fiber having a denier less than 12 dpf.

In some embodiments, during melt polymerization, zinc, e.g., zinc oxide is added to the aqueous monomer solution. The antimicrobial fiber may comprise a polyamide that is made in a melt polymerization process and not in a master batch process. In some aspects, the resulting fiber has permanent antimicrobial properties. The resulting fiber can be used for applications such as, e.g., athletic wear, leisure wear, socks, heavy hosiery, insoles, and shoe-related applications.

The antimicrobial agent may be added to the polyamide during melt polymerization, and thereafter, the fiber may be formed from extrusion. Of course, other fiber forming methods are also contemplated. The formed fibers may be spun to form a resultant yarn to be used in knitting and/or weaving to provide the antimicrobial properties in the fabrics. While polyamide may be used to explain one aspect of the disclosure, it is understood that numerous polymers may be used herein without deviating from the present scope of the disclosure.

A fabric can be made from the fibers. Garments made from these fabrics can withstand normal wear, and is devoid of any coated, doped, or topical treatment, which tends to abrade off during knitting and weaving. The abrasion process results in dust on machines and fabric, and lowers the effective use time of garments in normal wear and laundering.

In some embodiments, the polymer resin composition is extruded in order to create a fiber. The extrusion process itself depends on the temperature of the mixture being sufficiently high to melt the mixture. A melting step may be a separate step or it may be part of either the mixing process or the extruding process. When the mixture is at a sufficiently high temperature, the mixture may be extruded using conventional mechanisms. The fiber may then be drawn, crimped, cut and spun into a yarn or other fabric depending on the intended end use.

In some embodiments, the yarn or fabric or fibers may be dyed. In some embodiments, the yarn (or fibers or fabric) is dyed at a pH (or the dye recipe has a pH) of at least 3.0. e.g., at least 3.3, at least 3.5, at least 4.0, at least 4.1, at least 4.2, at least 4.3, at least 4.4, at least 4.5, at least 4.6, at least 4.7, at least 4.8, at least 4.9, at least 5.0, at least 5.2, at least 5.4, at least 5.6, least 5.8, at least 6.0, least 6.2, at least 6.4, at least 6.6, or at least 6.8. In some embodiments, the yarn is then dyed at a pH less than 7.0, e.g., less than 6.9, less than 6.8, less than 6.7, less than 6.6 less than 6.5, less than 6.4 less than 6.2, less than 6.0, less than 5.5, less than 5.0, less than 4.7, less than 4.6, or less than (and/or including) 4.5. In some embodiments, the yarn is then dyed at a pH (or the dye recipe has a pH) in a range from 3.0 to 7.0, e.g., from 3.3 to 6.5, from 3.3 to 5.5, from 3.3 to 4.5, from 3.3 to 3.7, from 4.0 to from 4.2 to 6.8, from 4.4 to 6.6, from 4.6 to 6.4, from 4.8 to 6.2, from 5.0 to 6.0, from 5.2 to 5.8, or from 5.4 to 5.6.

In some cases, it was unexpectedly found that dyeing the yarn at (or employing a dye recipe having) a pH of at least 5.0 does not extract any significant amounts of the antimicrobial agent from the PA composition. In conventional processes, additives tend to be removed from the fiber during subsequent finishing operations, such as, scouring or dyeing of the fiber. For example, if zinc is omitted from the polymer, phosphorus tends to be removed from the fiber during subsequent finishing operations, such as, scouring or dyeing of the fiber. On the other hand, if phosphorus is omitted from the polymer, zinc tends to reduce the molecular weight of the nylon, perhaps by reacting with functional groups. It is postulated that dyeing within the aforementioned pH ranges and limits provides for improved zinc retention.

In one embodiment, the polymer resin composition comprises less than 700 ppm, e.g., less than 500 ppm of zinc, the polymer resin composition comprises a delusterant including at least a portion of the phosphorus, fibers formed from the polymer resin composition inhibits greater than 89% of S. aureus as measured by ISO 20743:2013 and have a zinc retention greater than 45% as measured by a dye bath test.

In another embodiment, the polymer comprises a nylon, e.g., a nylon-based polymer, the zinc is provided via zinc oxide and/or zinc pyrithione, and the relative viscosity of the polymer resin composition ranges from 20 to 100.

In yet another embodiment, the polymer comprises nylon-6,6, the zinc is provided via zinc oxide, the weight ratio of zinc to phosphorus is at least 2:1, and the polymer resin composition inhibits greater than 95% of S. aureus as measured by ISO20743:2013 and wherein antimicrobial fibers formed from the polymer resin composition have a zinc retention greater than 60% as measured by a dye bath test.

In one embodiment, the antimicrobial fibers comprise the polymer comprising less than 700 ppm, e.g., less than 500 ppm of zinc, a delusterant including at least a portion of the phosphorus, and the antimicrobial fibers inhibit greater than 89% of S. aureus as measured by ISO 20743:2013 and have a zinc retention greater than 45% as measured by a dye bath test.

In another embodiment, the antimicrobial fibers comprise the polymer comprising nylon, the zinc is provided in the form of zinc oxide and/or zinc pyrithione and/or zinc ammonium adipate, the relative viscosity of the polymer resin composition ranges from 20 to 100, and the fibers have a zinc retention greater than 60%, e.g., greater than 80% as measured by a dye bath test, and the fibers have an average diameter less than 18 microns.

In yet another embodiment, the antimicrobial fibers comprise the polymer comprising nylon-6,6, the zinc is provided in the form of zinc oxide and/or zinc pyrithione, and/or zinc ammonium adipate, the weight ratio of zinc to phosphorus is at least 2:1, the fibers inhibit greater than 95% of S. aureus as measured by ISO20743:2013, the fibers have a zinc retention greater than 60%, e.g., greater than 90%, as measured by a dye bath test, the antimicrobial fibers have an average diameter less than 10 microns.

EXAMPLES

Examples 1-4 and Comparative Examples A and B

Fibers were prepared using nylon-6,6 (~98.4 wt % nylon-6,6), zinc compound (zinc ammonium adipate), and titanium dioxide with a phosphorus-containing coating (~1.6 wt % titanium dioxide). The nylon 6,6 polymer was made by a batch process in which nylon 6,6 salt was processed in an evaporator to achieve the desired concentration, and then polymerized in an autoclave using a typical four step process. The zinc ammonium adipate was added to the salt solution in an evaporation step before polymerization (so as to achieve the zinc levels indicated in Table 1). Titanium dioxide was added when the concentrated salt was transferred from the evaporator to the autoclave (so as to achieve the phosphorus levels indicated in Table 1). The polymers were then spun into yarn at approximately 4,600 meters per minute, and then drawn further until the final denier per filament was about 2 dpf and the average diameter of the fibers was less than 20 microns. The yarn was textured and made into fabric, and was dyed using the 13 recipes shown in Table 2. The dyed fabrics were tested for zinc retention and for antimicrobial efficacy (according to ISO20743:2013).

TABLE 1

Formulations

| | Ex./Comp. Ex. | | | | | |
|---|---|---|---|---|---|---|
| | A | B | 1 | 2 | 3 | 4 |
| N-6,6, wt % | ~98.4 | ~98.4 | ~98.4 | ~98.4 | ~98.4 | ~98.4 |
| Titanium dioxide, wt % | ~1.6 | ~1.6 | ~1.6 | ~1.6 | ~1.6 | ~1.6 |
| Zn (ppm) | —* | —* | 356 | 346 | 466 | 498 |
| P (ppm) | 78 | 78 | 78 | 77 | 79 | 108 |
| Zn:P ratio | 0 | 0 | 4.56 | 4.49 | 5.90 | 4.61 |
| Denier (dpf) | 2 | 1 | 2 | 1 | 2 | 1 |

*Comparative Examples A and B had negligible zinc levels, if any; in some cases, the dye recipe contained minute amounts of zinc, which affected retention numbers-these results were discarded

TABLE 2

Dye Recipes

| Dye recipe | I | II | III | IV | V | VI | VII |
|---|---|---|---|---|---|---|---|
| Dye type | 1, 2, 3 | 1, 2, 3 | 4, 5, 6 | 4, 5, 6 | 7, 8 | 7, 8 | 9, 10, 11 |
| pH | 5.0-5.5 | 5.0-5.5 | 4.0-4.5 | 4.0-4.5 | 4.0-4.5 | 4.0-4.5 | 3.3-3.7 |
| Acid | Acetic | Opticid | Acetic | Opticid | Acetic | Opticid | Citric |

| Dye recipe | VIII | IX | X | XI | XII | XIII |
|---|---|---|---|---|---|---|
| Dye type | 12, 13, 14 | 12, 13, 14 | 13, 14, 15 | 13, 14, 15 | 16, 2, 17 | 16, 2, 17 |
| pH | 5.0-5.5 | 5.0-5.5 | 5.0-5.5 | 5.0-5.5 | 5.0-5.5 | 5.0-5.5 |
| Acid | Acetic | Opticid | Acetic | Opticid | Acetic | Opticid |

Dyes

1 Optilan Golden Yellow MF-RL
2 Nylosan Red N-2RBL
3 Nylosan Blue N-BLN
4 Nylosan Yellow S-L
5 Nylosan Red S-3B
6 Nylosan Blue S-R
7 Lanasyn Dark Brown M-GLN
8 Lanasyn Black S-DL-C 120
9 Nylosan Yellow E-4G 200
10 Nylosan Rhaodamine B300
11 Nylosan Violet E-2R 300
12 Nylosan Yellow E-2RL
13 Nylosan Red E-BNLC 180
14 Nylosan Blue E-BGL 200
15 Nylosan Yellow E-4G 200
16 Optilan Golden Yellow MF-RL
17 Nylosan Br Blue N-FLB 180

\* Opticid is an acid donor

Zinc retention of Examples 1-4 was calculated by measuring zinc content before and after a dye bath using an Ahiba dyer (from Datacolor). For the dye bath, 200 ml of dye liquor were placed in a stainless steel can, the pH was adjusted to the desired level. 20 grams of un-dyed fabric were placed in the stainless steel can, which was loaded into the dyer. The sample was heated to 40° C., then heated to 100° C. (at 1.5° C./minute). The sample was held at 100° C. for 40 minutes, and then cooled to 40° C. at 2° C./minute; and rinsed and dried to yield the dyed product.

Comparative Examples A and B contained only negligible amounts of zinc, so retention numbers were not measured. Zinc retention results for Examples 1-4 are shown in Tables 3 and 4.

TABLE 3

Zinc Retention (ppm)

| | Dye recipe | | | | | |
|---|---|---|---|---|---|---|
| Ex. | I | II | III | IV | V | VI |
| 1 | 334 | 225 | 166 | 117 | 241 | 213 |
| 2 | 294 | 207 | 179 | 110 | 253 | 227 |
| 3 | 443 | 273 | 236 | 154 | 355 | 311 |
| 4 | 448 | 227 | 232 | 127 | 337 | 308 |

Zinc Retention (ppm) (Cont'd)

| | Dye recipe | | | | | |
|---|---|---|---|---|---|---|
| Ex. | VII | VIII | IX | X | XI | XII |
| 1 | 96.8 | 377 | 252 | 388 | 242 | 345 |
| 2 | 110 | 336 | 224 | 524 | 247 | 305 |
| 3 | 188 | 416 | 315 | 431 | 320 | 445 |
| 4 | 121 | 463 | 251 | 404 | 287 | 472 |

TABLE 4

Zinc Retention %

| | Dye recipe | | | | | |
|---|---|---|---|---|---|---|
| Ex. | I | II | III | IV | V | VI |
| 1 | 93.8% | 63.2% | 46.6% | 32.9% | 67.7% | 59.8% |
| 2 | 85.0% | 59.8% | 51.7% | 31.8% | 73.1% | 65.6% |
| 3 | 95.1% | 58.6% | 50.6% | 33.0% | 76.2% | 66.7% |
| 4 | 90.0% | 45.6% | 46.6% | 25.5% | 67.7% | 61.8% |

Zinc Retention % (Cont'd)

| | Dye recipe | | | | | |
|---|---|---|---|---|---|---|
| Ex. | VII | VIII | IX | X | XI | XII |
| 1 | 27.2% | 105.9% | 70.8% | 109.0% | 68.0% | 96.9% |
| 2 | 31.8% | 97.1% | 64.7% | 151.4% | 71.4% | 88.2% |
| 3 | 40.3% | 89.3% | 67.6% | 92.5% | 68.7% | 95.5% |
| 4 | 24.3% | 93.0% | 50.4% | 81.1% | 57.6% | 94.8% |

As shown, the Examples that utilized particular combinations of zinc and phosphorus, e.g., at zinc:phosphorus weight ratios of at least 1.3:1 or less than 0.64:1 (with at least some zinc being present), demonstrated excellent zinc retention. All of the Examples demonstrated zinc retention above 24%, which is an amount sufficient to reduce microbial activity (see *Klebsiella* and *Staph aureus* discussion below). In most cases, zinc retention was well over 50%. In particular, the Examples demonstrated zinc retention above 44%, and in most cases well over 50%, when employed with a dye recipe having higher pH values, e.g., over 4 (see Examples I, II, and VIII-XIII).

Examples 1-4 and Comparative Examples A and B were also tested for antimicrobial efficacy (*Klebsiella* and *Staph aureus*) according to ISO20743:2013. The results are shown in Table 5.

TABLE 5

Antimicrobial efficacy

| | Dye recipe | | | | | | |
|---|---|---|---|---|---|---|---|
| | I | II | III | IV | V | VI | VII |
| Ex./Comp. Ex. | | | Klebsiella Reduction, % | | | | |
| 1 | >99.9 | >99.9 | >99.9 | >99.9 | >99.9 | >99.9 | >99.9 |
| 2 | >99.9 | >99.9 | >99.9 | 97.8 | >99.9 | >99.9 | >99.9 |
| 3 | >99.9 | >99.9 | >99.9 | >99.9 | >99.9 | >99.9 | >99.9 |
| 4 | >99.9 | >99.9 | >99.9 | >99.9 | >99.9 | >99.9 | >99.9 |
| A | 25.1 | 29.7 | 28.4 | 50.0 | 46.4 | 46.2 | 46.7 |
| B | 27.5 | 40.7 | 29.0 | 76.1 | 54.6 | 54.9 | 54.8 |

TABLE 5-continued

Antimicrobial efficacy (Cont'd)

| | Dye recipe | | | | | | |
|---|---|---|---|---|---|---|---|
| Ex./ Comp.Ex. | I | II | III | IV | V | VI | VII |
| | Staph Aureus Reduction, % | | | | | | |
| 1 | >99.9 | 97.9 | 99.7 | 97.2 | >99.9 | >99.9 | 93.9 |
| 2 | >99.9 | >99.9 | >99.9 | 92.4 | >99.9 | >99.9 | >99.9 |
| 3 | >99.9 | >99.9 | >99.9 | 99.1 | >99.9 | >99.9 | 89.4 |
| 4 | >99.9 | >99.9 | >99.9 | 99.9 | >99.9 | >99.9 | 95.4 |
| A | 0 | 0 | 7.6 | 78.9 | 57.2 | 70.8 | 0 |
| B | 0 | 0 | 0 | 85.4 | 43.2 | 54.3 | 0 |

Importantly, along with the superior zinc retention performance, the formulations of Examples 1-4 demonstrated significant antimicrobial activity in terms of *Klebsiella* reduction and *Staph aureus* reduction. As shown in Table 5, *Klebsiella* reduction was well over 95% and *Staph aureus* reduction was generally well over 90%. In contrast, Comparative Examples A and B demonstrated *Klebsiella* reductions of 76% at most, with most results ranging from 25% to 55%, which is well below required levels. In terms of *Staph aureus* reduction, Comparative Examples A and B demonstrated 85% reductions at most, with most ranging from 0% to 70%, which is well below required levels.

Examples 5 and 6 and Comparative Example C

Fibers containing zinc compound and phosphorus compound were prepared and tested. The zinc and phosphorus content of the respective examples were as shown in Table 6. Nylon 6,6 polymer was made by a batch process in which nylon 6,6 salt was processed in an evaporator to achieve the desired concentration, and then polymerized in an autoclave using a typical four step process. The antimicrobial zinc polymer additive was added to the salt solution in an evaporation step before polymerization, and 1.6 wt % TiO$_2$ was added when the concentrated salt was transferred from the evaporator to the autoclave. The TiO$_2$ was coated with a phosphorus-containing coating. The polymers were then spun into yarn at approximately 2,200 meters per minute, and then drawn further until the final denier per filament was about 2 dpf and the average diameter of the fibers was less than 16 micron. The antimicrobial (anti-bacterial) properties of Examples 5 and 6 and Comparative Example C were tested for *Staph aureus* activity according to 2 test standards: ASTM E35.15 WK45351 modified* (standard 1) and ASTM E2149 modified** (standard 2).

Each test standard utilized two separate treatments: Treatment 1 tested "as-spun" yarn and Treatment 2 tested yarn that was first extracted with acetone, and then was extracted using boiling water for one hour. Colony forming units were measured. Comparative Example C, which did not contain any zinc compound and had a zinc:phosphorus ratio of 0, represents a baseline for antimicrobial properties. The results are shown in Table 6.

TABLE 6

Formulations and Results

| | C | 5 | 6 |
|---|---|---|---|
| N-6,6, wt % | ~98.4 | ~98.4 | ~98.4 |
| Titanium dioxide, wt % | ~1.6 | ~1.6 | ~1.6 |
| Zn (ppm) | 0 | 327 | 478 |
| P (ppm) | 74 | 73 | 76 |

TABLE 6-continued

Formulations and Results

| | | | |
|---|---|---|---|
| Zn:P ratio | 0 | 4.3 | 6.5 |
| Denier (dpf) | 2 | 2 | 2 |

Standard 1

| | CFU***/ml | CFU/ml (% Reduction) | CFU/ml (% Reduction) |
|---|---|---|---|
| Treatment 1 | 55,400 | 48,000 (13.36%) | 4,070 (92.65%) |
| Treatment 2 | 213,000 | 10,400 (95.12%) | 3,870 (98.18%) |

Standard 2

| | CFU/ml | CFU/ml (% Reduction) | CFU/ml (% Reduction) |
|---|---|---|---|
| Treatment 1 | 690,000 | 14,600 (97.88%) | 30 (99.87%) |
| Treatment 2 | 2,070 | 750 (63.77%) | 30 (98.55%) |

\* Single specimen, 1.5 gram specimen, 15 ml neutralizer, test performed once
\*\* Single specimen, 1.5 gram specimen, 20 ml of inoculum, 8 hour incubation time, test performed once
\*\*\*CFU—Colony Forming Units As shown in Table 6, for Standard 1, Examples 5 and 6 demonstrated 13.36% ((55,400−48,000)/55,400) and 92.65% reductions in *Staph aureus* (as compared to Comparative Example C) respectively, when tested under Treatment 1, and 95.12% and 98.18% reductions when tested under Treatment 2.

Also as shown in Table 6, for Standard 2, Examples 5 and 6 demonstrated 97.88% and ~100% reductions in *Staph aureus*, respectively, when tested under Treatment 1, and 63.77% and 98.55% reductions when tested under Treatment 2.

Importantly, both the average fiber diameter and the dpf were low, so the fibers and the resultant products formed therefrom were suitable for to next-to-skin textiles, unlike coarse, conventional carpet fibers, which have significantly higher denier and fiber diameter.

Embodiments

The following embodiments are contemplated. All combinations of features and embodiments are contemplated.

Embodiment 1: A polymer resin composition having permanent antimicrobial properties comprising: a polymer; less than 2500 ppm of zinc dispersed within the polymer; and less than 2500 ppm of phosphorus; wherein the weight ratio of the zinc to the phosphorus: is at least 1.3:1; or less than 0.64:1.

Embodiment 2: An embodiment of embodiment 1, wherein the weight ratio of the zinc to the phosphorus is at least 2:1.

Embodiment 3: An embodiment of any of embodiments 1 and 2, wherein the relative viscosity of the polymer resin composition ranges from 20 to 100.

Embodiment 4: An embodiment of any of embodiments 1-3, wherein the polymer resin composition comprises from 200 ppm to 600 ppm zinc, optionally less than 500 ppm of zinc.

Embodiment 5: An embodiment of any of embodiments 1-4, wherein the polymer resin composition comprises a delusterant including at least a portion of the phosphorus.

Embodiment 6: An embodiment of any of embodiments 1-5, wherein dyed antimicrobial fibers formed from the polymer resin composition have a zinc retention greater than 40%, when the fibers are dyed using a dye recipe having a pH greater than 4.5.

Embodiment 7: An embodiment of any of embodiments 1-6, wherein dyed antimicrobial fibers formed from the polymer resin composition have a zinc retention greater than 20%, when the fibers are dyed using a dye recipe having a pH less than 5.0.

Embodiment 8: An embodiment of any of embodiments 1-7, wherein the polymer resin composition comprises no phosphorus.

Embodiment 9: An embodiment of any of embodiments 1-8, wherein the zinc is provided via a zinc compound comprising zinc oxide, zinc acetate, zinc ammonium carbonate, zinc ammonium adipate, zinc stearate, zinc phenyl phosphinic acid, zinc pyrithione and/or combinations thereof.

Embodiment 10: An embodiment of embodiment 9, wherein the zinc compound is not zinc phenyl phosphinate and/or zinc phenyl phosphonate.

Embodiment 11: An embodiment of any of embodiments 1-10, wherein the phosphorus is provided via a phosphorus compound comprising phosphoric acid, benzene phosphinic acid, benzene phosphonic acid, manganese hypophosphite, sodium hypophosphite, monosodium phosphate, hypophosphorous acid, phosphorous acid, and/or combinations thereof.

Embodiment 12: An embodiment of any of embodiments 1-11, wherein the polymer resin composition comprises less than 700 ppm zinc, e.g., less than 500 ppm of zinc, wherein the polymer resin composition comprises a delusterant including at least a portion of the phosphorus, and wherein the polymer resin composition inhibits greater than 89% of *S. aureus* as measured by ISO 20743:2013 and optionally wherein antimicrobial fibers formed from the polymer resin composition have a zinc retention greater than 45% as measured by a dye bath test, when the fibers are dyed using a dye recipe having a pH greater than 4.5.

Embodiment 13: An embodiment of any of embodiments 1-12, wherein the polymer comprises a nylon, wherein the zinc is provided via zinc oxide and/or zinc pyrithione, and wherein the relative viscosity of the polymer resin composition ranges from 20 to 100.

Embodiment 14: An embodiment of any of embodiments 1-13, wherein the polymer comprises nylon-6,6, wherein the zinc is provided via zinc oxide, wherein the weight ratio of zinc to phosphorus is at least 2:1, and wherein the polymer resin composition inhibits greater than 95% of *S. aureus* as measured by ISO 20743:2013 and optionally wherein antimicrobial fibers formed from the polymer resin composition have a zinc retention greater than 60% as measured by a dye bath test, when the fibers are dyed using a dye recipe having a pH greater than 4.5.

Embodiment 15: An embodiment of any of embodiments 1-14, further comprising one or more additional antimicrobial agents comprising silver, tin, copper, and gold, and alloys, oxides, and/or combinations thereof.

Embodiment 16: An antimicrobial fiber having permanent antimicrobial properties comprising: a polymer; less than 2500 ppm of zinc dispersed within the polymer; and less than 1000 ppm of phosphorus; wherein the denier of the antimicrobial fiber is less than 12 dpf.

Embodiment 17: An embodiment of embodiment 16, wherein the weight ratio of zinc to phosphorus is: at least 1.3:1; or less than 0.64:1.

Embodiment 18: An embodiment of any of embodiments 16 or 17, wherein the weight ratio of the zinc to the phosphorus is at least 2:1.

Embodiment 19: An embodiment of any of embodiments 16-18, wherein the fibers have an average diameter less than 20 microns.

Embodiment 20: An embodiment of any of embodiments 16-19, wherein the polymer comprises from 200 ppm to 600 ppm zinc, optionally less than 500 ppm of zinc.

Embodiment 21: An embodiment of any one of embodiments 16-20, wherein the polymer comprises a delusterant including at least a portion of the phosphorus.

Embodiment 22: An embodiment of any of embodiments 16-21, wherein the antimicrobial fiber has a zinc retention greater than 20%, e.g., greater than 45%, greater than 70%, as measured by a dye bath test.

Embodiment 23: An embodiment of any of embodiments 16-22, wherein the zinc is a zinc compound comprising zinc oxide, zinc acetate, zinc ammonium carbonate, zinc ammonium adipate, zinc stearate, zinc phenyl phosphinic acid, zinc pyrithione and/or combinations thereof.

Embodiment 24: An embodiment of any of embodiments 16-23, wherein the phosphorus is a phosphorus compound comprising phosphoric acid, benzene phosphinic acid, benzene phosphonic acid, manganese hypophosphite, sodium hypophosphite, monosodium phosphate, hypophosphorous acid, phosphorous acid, and/or combinations thereof.

Embodiment 25: An embodiment of any of embodiments 16-24, wherein the polymer comprises less than 700 ppm of zinc, e.g., less than 500 ppm of zinc, wherein the polymer comprises a delusterant including at least a portion of the phosphorus, and wherein the antimicrobial fiber inhibits greater than 89% of *S. aureus* as measured by ISO 20743:2013 and optionally wherein antimicrobial fibers formed from the polymer resin composition have a zinc retention greater than 45% as measured by a dye bath test, when the fibers are dyed using a dye recipe having a pH greater than 4.5.

Embodiment 26: An embodiment of any of embodiments 16-25, wherein the polymer comprises nylon, wherein the zinc is provided in the form of zinc oxide and/or zinc pyrithione and/or optionally zinc ammonium adipate, wherein the relative viscosity of the polymer resin composition ranges from 20 to 100, and wherein the antimicrobial fiber has a zinc retention greater than 80% as measured by a dye bath test, and wherein the fibers have an average diameter less than 18 microns.

Embodiment 27: An embodiment of any of embodiments 16-26, wherein the polymer comprises nylon-6,6, wherein the zinc is provided in the form of zinc oxide, wherein the weight ratio of zinc to phosphorus is at least 2:1, wherein the antimicrobial fiber inhibits greater than 95% of *S. aureus* as measured by ISO 20743:2013, wherein the antimicrobial fibers, when dyed, have a zinc retention greater than 60%, e.g., greater than 90%, as measured by a dye bath test wherein the fibers are dyed using a dye recipe having a pH greater than 4.5, wherein the antimicrobial fibers have an average diameter less than 10 microns, and wherein the fibers have a denier per filament less than 5 dpf.

Embodiment 28: An embodiment of any of embodiments 16-27, wherein the polymer further comprises one or more additional antimicrobial agents comprising silver, tin, copper, and gold, and alloys, oxides, and/or combinations thereof.

Embodiment 29: A process for preparing an antimicrobial fiber having permanent antimicrobial properties, the process comprising: preparing an aqueous monomer solution; adding less than 2500 ppm of zinc dispersed within the aqueous monomer solution; adding less than 1000 ppm of phosphorus; polymerizing the aqueous monomer solution to form a polymer melt; and extruding the polymer melt to form an antimicrobial fiber, wherein the weight ratio of zinc to phosphorus is at least 1.3:1 or less than 0.64:1; wherein the antimicrobial fibers have a denier per filament of less than 12 dpf.

Embodiment 30: An embodiment of embodiment 29, further comprising: spinning the antimicrobial fiber to form a yarn; and dyeing the yarn.

Embodiment 31: An embodiment of any of embodiments 29 or 30, wherein the polymer comprises from 200 ppm to 600 ppm zinc, optionally less than 500 ppm of zinc.

Embodiment 32: An embodiment of any of embodiments 29-31, wherein the antimicrobial fiber has a zinc retention greater than 45%, e.g., greater than 70%, when the fibers are dyed using a dye recipe having a pH greater than 4.5.

Embodiment 33: An embodiment of any of embodiments 29-32, wherein the step of adding phosphorus comprises adding a delusterant including at least a portion of the phosphorus.

Embodiment 34: An embodiment of any of embodiments 29-33, further comprising the step dyeing the antimicrobial fibers using a dye recipe to form dyed antimicrobial fibers; wherein the dye recipe has a pH ranging from 3.0 to 7.0; and wherein the dyed antimicrobial fibers have a zinc retention greater than 20%.

Embodiment 35: An embodiment of any of embodiments 29-34 further comprising the steps of forming a yarn or fabric from the antimicrobial fibers; and dyeing the yarn or fabric.

Embodiment 36: Antimicrobial fibers having permanent antimicrobial properties comprising: a polymer; zinc dispersed within the polymer; and less than 1000 ppm of phosphorus; wherein the antimicrobial fibers demonstrate a zinc retention greater than 20%, after a dye bath using a dye recipe having a pH values, e.g., less than 5.0.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that embodiments of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art.

We claim:

1. A polyamide resin composition for molded products having permanent antimicrobial properties, the polyamide composition comprising: a polyamide selected from the group consisting of PA-4T/41, PA-4T/6I, PA-5T/5I, PA-6, PA-6,6, PA-6,6/6, PA-6,6/6T, PA-6T/6I, PA-6T/6I/6, PA-6IT/6, PA-6T/6I/66, PA-6T/MPMDT, PA-6T/66, PA-6I/610, PA-10T/612, PA-10T/106, PA-6IT/612, PA-6I/10T, PA-6I/101, PA-9T, PA-10T, PA-12T, PA-10T/101, PA-10T/12, PA-10T/11, PA-6T/9T, PA-6I/12T, PA-6I/10T/6I, PA-6T/6I/6, PA-6T/6I/12, and combinations thereof;
molding additives comprising impact modifiers, heat stabilizers, lubricants, fillers, chain terminators, or plasticizers, or combinations thereof;
zinc dispersed within the polyamide;
less than 1000 ppm of phosphorus;
wherein the weight ratio of the zinc to the phosphorus is 2:1 to 30:1.

2. The polyamide resin composition of claim 1, wherein the weight ratio of the zinc to the phosphorus is greater than 2:1 to less than 30:1.

3. The polyamide resin composition of claim 1, wherein the relative viscosity of the polyamide resin composition ranges from 20 to 100.

4. The polyamide resin composition of claim 1, wherein the polyamide resin composition comprises a delusterant including at least a portion of the phosphorus.

5. The polyamide resin composition of claim 1, wherein the zinc is provided via a zinc compound comprising zinc oxide, zinc acetate, zinc ammonium carbonate, zinc ammonium adipate, zinc stearate, zinc phenyl phosphinic acid, zinc pyrithione and/or combinations thereof.

6. The polyamide resin composition of claim 1, wherein the phosphorus is provided via a phosphorus compound comprising phosphoric acid, benzene phosphinic acid, benzene phosphonic acid, manganese hypophosphite, sodium hypophosphite, monosodium phosphate, hypophosphorous acid, phosphorous acid, and/or combinations thereof.

7. The polyamide resin composition of claim 1, wherein the polyamide resin composition comprises a delusterant including at least a portion of the phosphorus, wherein molded products formed from the polyamide resin composition inhibits greater than 89% of *S. aureus* as measured by ISO 20743:2013.

8. The polyamide resin composition of claim 1, wherein the polyamide comprises PA-6,6, wherein the zinc is provided via zinc oxide, wherein the weight ratio of zinc to phosphorus is greater than 2:1 and less than 30:1, wherein the polyamide resin composition inhibits greater than 95% of *S. aureus* as measured by ISO 20743:2013.

9. A molded product having permanent antimicrobial properties comprising: a polyamide selected from the group consisting of PA-4T/41, PA-4T/6I, PA-5T/5I, PA-6, PA-6,6, PA-6,6/6, PA-6,6/6T, PA-6T/6I, PA-6T/6I/6, PA-6IT/6, PA-6T/6I/66, PA-6T/MPMDT, PA-6T/66, PA-6I/610, PA-10T/612, PA-10T/106, PA-6IT/612, PA-6I/10T, PA-6I/101, PA-9T, PA-10T, PA-12T, PA-10T/101, PA-10T/12, PA-10T/11, PA-6T/9T, PA-6I/12T, PA-6I/10T/6I, PA-6T/6I/6, PA-6T/6I/12, and combinations thereof;
molding additives comprising comprising impact modifiers, heat stabilizers, lubricants, fillers, chain terminators, or plasticizers, or combinations thereof;
zinc dispersed within the polyamide;
and less than 1000 ppm of phosphorus; wherein the weight ratio of zinc to phosphorus is 2:1 to 30:1.

10. The molded products of claim 9, wherein the polyamide comprises a delusterant including at least a portion of the phosphorus, wherein the molded products inhibit greater than 89% of *S. aureus* as measured by ISO 20743:2013.

11. The molded products of claim 9, wherein the polyamide comprises PA-6,6, wherein the zinc is provided in the form of zinc oxide and/or zinc pyrithione, and/or zinc ammonium adipate, wherein the weight ratio of zinc to phosphorus is greater than 2:1, wherein the molded products inhibit greater than 95% of *S. aureus* as measured by ISO 20743:2013.

12. A process for preparing molded products having permanent antimicrobial properties, the process comprising:
preparing an aqueous monomer solution;
adding zinc dispersed within the aqueous monomer solution;
adding less than 1000 ppm of phosphorus;

polymerizing the aqueous monomer solution to form a polyamide melt; and molding the polyamide melt and molding additives to form the molded products, wherein the molding additives comprise impact modifiers, heat stabilizers, lubricants, fillers, chain terminators, or plasticizers, or combinations thereof;

wherein the weight ratio of zinc to phosphorus is: 2:1 to 30:1;

wherein the polyamide is selected from the group consisting of PA-4T/4I, PA-4T/6I, PA-5I/5I, PA-6, PA-6,6, PA-6,6/6, PA-6,6/6T, PA-6T/6I, PA-6T/6I/6, PA-6I/6, PA-6T/6I/66, PA-6T/MPMDT, PA-6I/66, PA-6I/610, PA-10T/612, PA-10T/106, PA-6I/612, PA-6I/10T, PA-6T/10I, PA-9T, PA-10T, PA-12T, PA-10I/10I, PA-10T/12, PA-10T/11, PA-6I/9T, PA-6I/12T, PA-6I/10T/6I, PA-6T/6I/6, PA-6T/6I/12, and combinations thereof.

13. The polyamide resin composition of claim 1, wherein the molded products comprise catheters for medical purposes, prostheses, products for repairing bones, and blood transfusion bags.

14. The polyamide resin composition of claim 1, wherein the molding additives comprise ethylene bis-stearamide, polyethylene wax, oleamide, erucamide, calcium stearate, or polytetrafluoroethylene, or combinations thereof.

15. The molded product of claim 9, wherein the molded product comprises catheters for medical purposes, prostheses, products for repairing bones, and blood transfusion bags.

16. The molded product of claim 9, wherein the molding additives comprise ethylene bis-stearamide, polyethylene wax, oleamide, erucamide, calcium stearate, or polytetrafluoroethylene, or combinations thereof.

17. The process of claim 12, wherein the molded products comprise catheters for medical purposes, prostheses, products for repairing bones, and blood transfusion bags.

18. The process of claim 12, wherein the molding additives comprise ethylene bis-stearamide, polyethylene wax, oleamide, erucamide, calcium stearate, or polytetrafluoroethylene, or combinations thereof.

* * * * *